US012473759B2

(12) United States Patent
Toyama et al.

(10) Patent No.: US 12,473,759 B2
(45) Date of Patent: Nov. 18, 2025

(54) HANDLE DEVICE FOR VEHICLE

(71) Applicant: ALPHA CORPORATION, Kanagawa (JP)

(72) Inventors: Takao Toyama, Yokohama (JP); Takashi Ono, Yokohama (JP); Mitsuo Nishizuka, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 240 days.

(21) Appl. No.: 18/334,504

(22) Filed: Jun. 14, 2023

(65) Prior Publication Data

US 2023/0323710 A1 Oct. 12, 2023

Related U.S. Application Data

(63) Continuation of application No. PCT/JP2021/045910, filed on Dec. 13, 2021.

(30) Foreign Application Priority Data

Dec. 23, 2020 (JP) ................................ 2020-213423

(51) Int. Cl.
*E05B 85/10* (2014.01)

(52) U.S. Cl.
CPC ................................ *E05B 85/107* (2013.01)

(58) Field of Classification Search
CPC ...... E05B 85/103; E05B 85/107; E05B 79/06; E05B 63/0056
See application file for complete search history.

(56) References Cited

U.S. PATENT DOCUMENTS 5,282,657 A * 2/1994 Clinch .................... E05B 85/12 292/DIG. 31
5,340,174 A * 8/1994 Bender .................... E05B 79/06 292/DIG. 31
5,377,450 A * 1/1995 Varajon .................. E05B 85/12 296/146.7
6,039,366 A * 3/2000 Lewis ..................... E05B 85/18 292/DIG. 64

(Continued)

FOREIGN PATENT DOCUMENTS

CN 210714214 U * 6/2020
CN 111836941 A 10/2020

(Continued)

OTHER PUBLICATIONS

Espacenet machine translation of WO 2019/172057 A1, generated Apr. 1, 2025 (Year: 2025).*

(Continued)

*Primary Examiner* — Kristina R Fulton
*Assistant Examiner* — Emily G. Brown
(74) *Attorney, Agent, or Firm* — Studebaker Brackett PLLC

(57) ABSTRACT

A handle device for a vehicle includes a handle base fixed to a vehicle, and a handle main body connected to the handle base and configured to be able to be pulled out from an initial position. The handle base is provided with an adjustment portion. The adjustment portion is configured to be operable by being exposed to outside when the handle main body is pulled out from the initial position, and to adjust a position of the handle main body at the initial position.

5 Claims, 10 Drawing Sheets

(56) References Cited

U.S. PATENT DOCUMENTS

| | | | | |
|---|---|---|---|---|
| 8,720,118 | B2 * | 5/2014 | Meyers | E05B 77/04 49/460 |
| 10,435,922 | B2 * | 10/2019 | Kovie | E05B 85/12 |
| 2013/0079984 | A1 * | 3/2013 | Aerts | G07C 9/00944 292/336.3 |
| 2016/0298366 | A1 | 10/2016 | Och | |
| 2018/0044951 | A1 * | 2/2018 | Wleklinski, III | E05B 79/06 |
| 2020/0115936 | A1 | 4/2020 | Och | |
| 2020/0392771 | A1 | 12/2020 | Toyama | |
| 2021/0363795 | A1 | 11/2021 | Toyama | |
| 2022/0018167 | A1 * | 1/2022 | Rocci | E05B 85/103 |

FOREIGN PATENT DOCUMENTS

| | | | | | |
|---|---|---|---|---|---|
| DE | 102019007141 | A1 | * | 9/2020 | |
| GB | 2237056 | A | * | 4/1991 | E05B 79/06 |
| JP | S53-038713 | U | | 4/1978 | |
| JP | S57-004222 | Y2 | | 1/1982 | |
| JP | H11-182104 | A | | 7/1999 | |
| JP | 2016-537532 | A | | 12/2016 | |
| JP | 2020-128655 | A | | 8/2020 | |
| WO | WO-2019172057 | A1 | * | 9/2019 | E05B 85/107 |
| WO | WO-2020094270 | A1 | * | 5/2020 | E05B 85/107 |

OTHER PUBLICATIONS

Espacenet machine translation of WO 2020/094270 A1, generated Apr. 1, 2025 (Year: 2025).*

International Search Report issued in PCT/JP2021/045910; mailed Feb. 8, 2022.

Extended European Search Report issued in EP 21 91 0450.2-1005 by the European Patent Office on Nov. 11, 2024, which is related to U.S. Appl. No. 18/334,504.

* cited by examiner

HANDLE DEVICE FOR VEHICLE

CROSS-REFERENCE TO RELATED APPLICATIONS

The present application is a continuation application of PCT/JP2021/045910 that claims priority to Japanese Patent Application No. 2020-213423 filed on Dec. 23, 2020, the entire content of which is incorporated herein by reference.

TECHNICAL FIELD

The present disclosure relates to a handle device for a vehicle.

BACKGROUND ART

Patent Literature 1 discloses a handle device including a handle main body that can be pulled out from an initial position during a door operation.

In this related art, the handle device includes a handle portion (handle main body) rotatably connected to one end of an operation lever driven by an electric motor (electric actuator) fixed on a handle base, and a lock release lever connected to an end opposite to a connection end of the handle main body to the operation lever, and one end of the handle main body and a guide portion formed on one end of the lock release lever are slidably fitted to a guide with a slit formed on the handle base.

When the electric actuator is operated, the handle main body moves from an initial position where the handle main body is positioned on the same surface as a door panel to an operation position where the handle main body is lifted from the door panel, and when the handle main body is operated at the operation position, a release operation of a door latch device can be performed.

Patent Literature 1: JP2016-537532A

However, in the related art described above, the initial position is uniquely determined by a dimensional relationship between components, and when there is a dimension error or the like, there is a possibility that the handle main body is not held on the same surface as the door panel.

The present disclosure relates to a handle device for a vehicle in which a positional relationship between a handle main body and a surface of a door panel can be adjusted to a predetermined position even if there is an error between components.

SUMMARY OF INVENTION

According to an embodiment of the present disclosure, a handle device for a vehicle includes a handle base fixed to a vehicle, and a handle main body connected to the handle base and configured to be able to be pulled out from an initial position. The handle base is provided with an adjustment portion. The adjustment portion is configured to be operable by being exposed to outside when the handle main body is pulled out from the initial position, and to adjust a position of the handle main body at the initial position.

DESCRIPTION OF EMBODIMENTS

Figure 1:
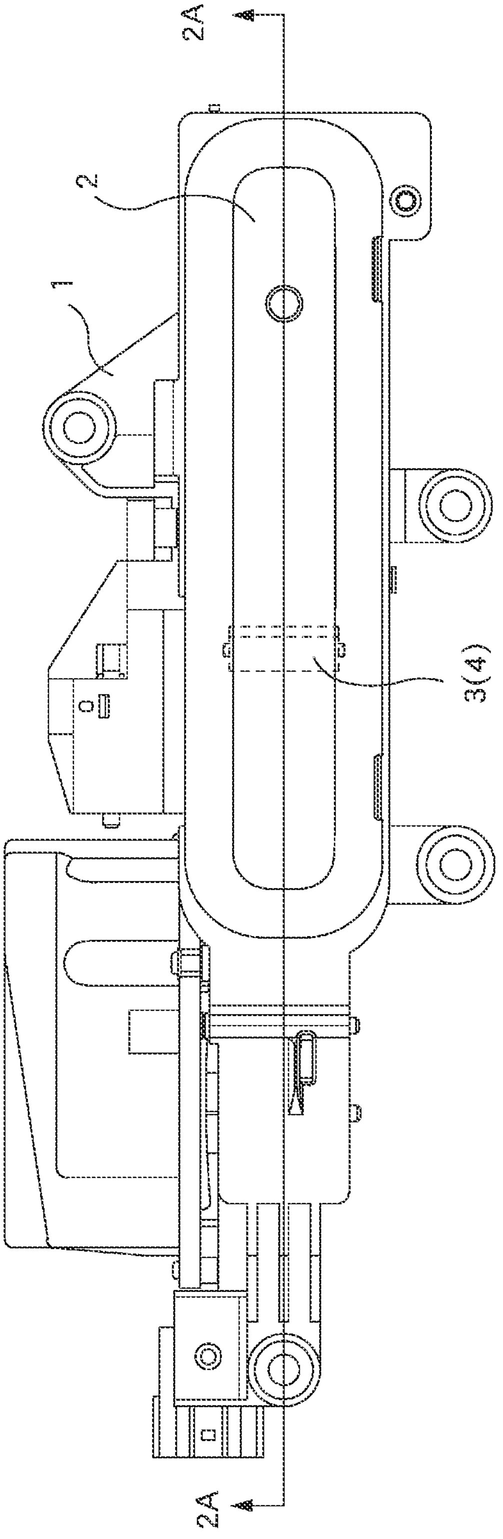
FIG. 1 is a front view showing a door handle device.

As shown in FIG. 1, the door handle device includes a handle base 1, a handle main body 2, and first and second links 12, 13 that connect the handle main body 2 to the handle base 1. The handle base 1 is fixed to a door of the vehicle.

Figure 2:
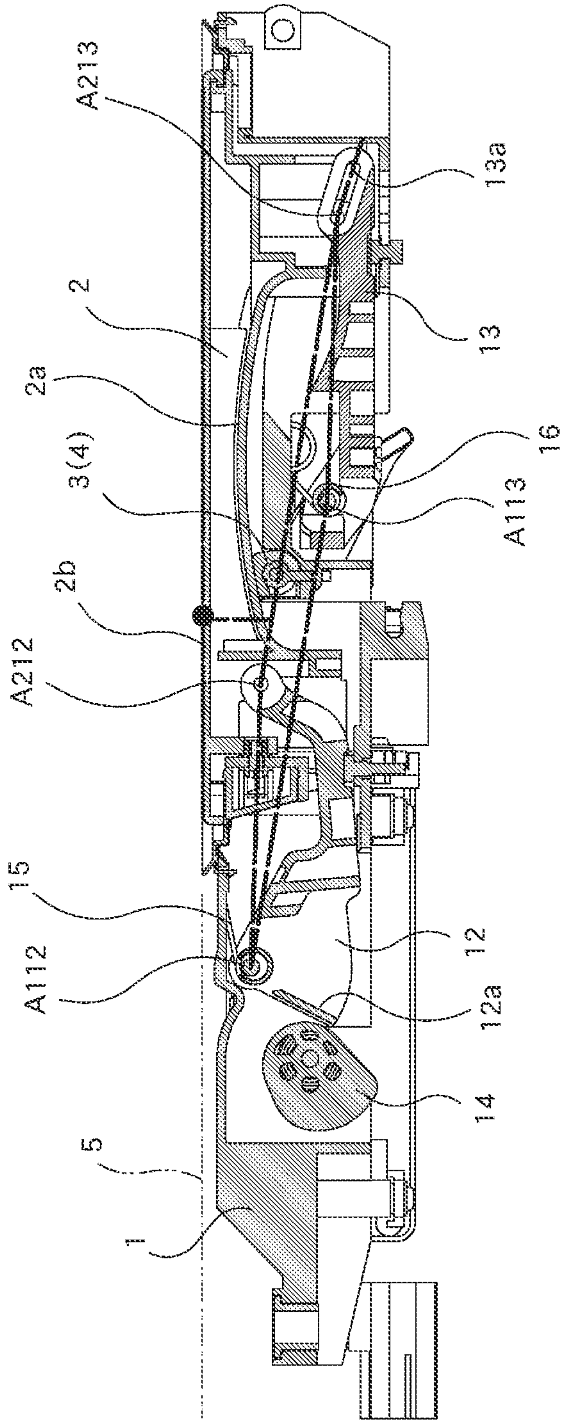
FIG. 2 is a sectional view taken along a line 2A-2A in FIG. 1.
Figure 3A:
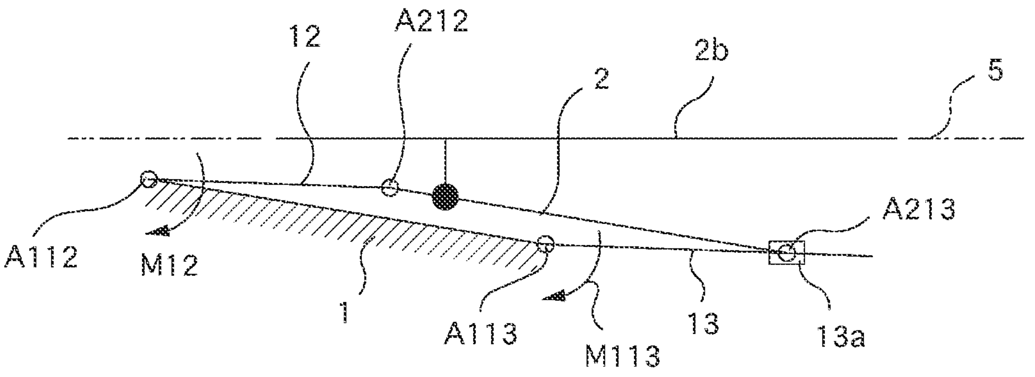
FIG. 3A is a skeleton diagram of the door handle device and shows an initial state of a handle main body.

A hand hold portion 2*a*, which is held when a door is operated, is formed in a central portion of the handle main body 2 in a longitudinal direction. The handle main body 2 is configured to be movable between an initial position, a pop-up position, and a latch operation position to be described below. When the handle main body 2 is positioned at the initial position in a state in which the handle base 1 is fixed to the door, a surface 2*b* of the handle main body 2 becomes substantially the same surface as a door panel (a door surface 5) as shown in FIGS. 2 and 3A, and the hand hold portion 2*a* is accommodated in the door. When the handle main body 2 is positioned at the pop-up position (FIG. 3B), the hand hold portion 2*a* pops out of the door panel, and the handle main body 2 can be operated by putting a hand over the hand hold portion 2*a*. When the handle main body 2 is positioned at the latch operation position, as shown in FIG. 3C, the handle main body 2 is in a state in which one end of the handle main body 2 is pulled up from the pop-up position.

A driven portion 12*a* of the first link 12 is pressed against a cam member 14 that is rotationally driven by a motor (not shown), and the first link 12 is driven to rotate about a connecting shaft A112 to the handle base 1. In order to maintain a pressure contact state between the driven portion 12*a* and the cam member 14, as shown in FIGS. 2 and 3A, a clockwise rotational moment M12 is applied to the first link 12 by a torsion spring 15.

An end of the first link 12 opposite to a connecting end of the first link 12 to the handle base 1 is rotatably connected to one end of the handle main body 2 about a connecting shaft A212.

On the other hand, one end of the second link 13 is rotatably connected to the handle base 1 about a connecting shaft A113. A long hole 13*a* is formed at an opposite end of the second link 13, and a connecting shaft A213 fixed to the other end of the handle main body 2 is rotatably and slidably inserted.

Therefore, as shown in FIG. 3A, component members of the handle device constitute a 5-node link mechanism having the handle base 1 as a fixed link, the first and second links 12, 13 connected to the fixed link by revolute pairs at intervals between the connecting shafts A112, A113, the slider long hole 13*a* connected to the second link 13 by a sliding pair, and the handle main body 2 having both ends connected to the first link 12 and the slider 13*a* in a revolute pair, as elements.

A sliding stroke end of the slider 13*a* sliding on the second link 13 is determined in advance as an end position of the long hole 13*a*, and in addition to the rotational moment M12 applied to the first link 12 described above, a clockwise rotational moment M113 in FIG. 3A is applied to the second link 13 by a torsion spring 16, whereby the slider 13*a* is held at a stroke end position on the connecting shaft A113 side of the second link 13 to the handle base 1.

Since link lengths of the fixed link and the handle main body 2 are equal to each other, and a distance (distance between the connecting shafts A113 and A213 in FIG. 3A) between the slider 13*a* at the stoke end position and the connecting shaft A113 of the fixed link of the second link 13 is equal to a link length of the first link 12, when an electric rotation operation is performed using the first link 12 as a drive link, the handle device substantially operates as a parallel link of four nodes.

Figure 3B:
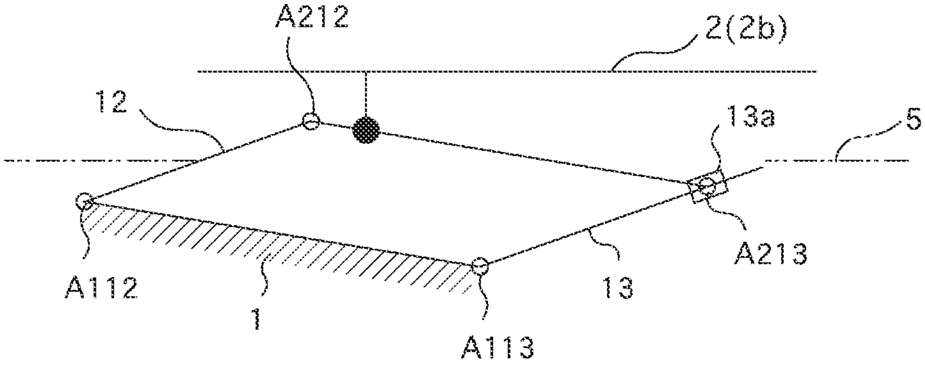
FIG. 3B is a skeleton diagram of the door handle device and shows a pop-up position of the handle main body.
Figure 3C:
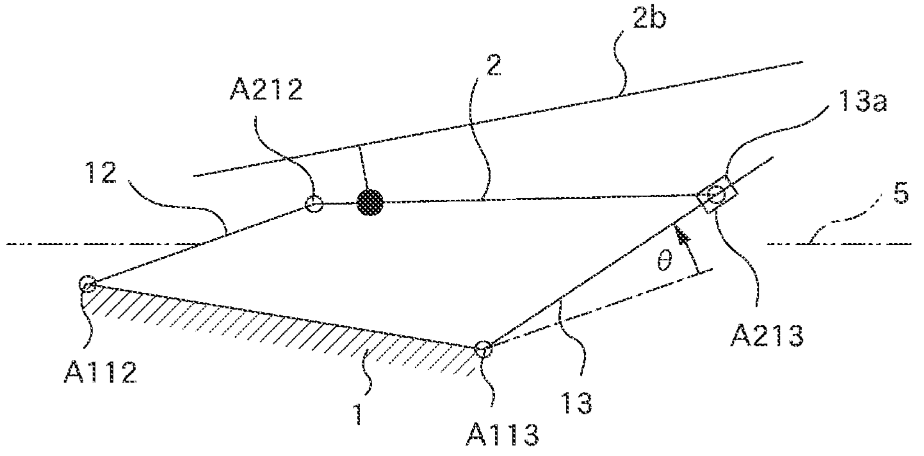
FIG. 3C is a skeleton diagram of the door handle device and shows an operation position of the handle main body.

Therefore, when the first link 12 is driven to rotate counterclockwise in FIG. 3A from an initial state shown in FIGS. 2 and 3A in which the surface 2*b* of the handle main body 2 is flush with the door panel 5, the handle main body 2 moves in parallel and moves to the pop-up position shown in FIG. 3B.

From this state, when the handle main body 2 is manually rotated in a counterclockwise direction and is rotated to the latch operation position as shown in FIG. 3C, since the rotation of the first link 12 in the counterclockwise direction about the connecting shaft A112 with the handle base 1 is restricted by the motor, a slider crank mechanism substantially using the handle main body 2, the second link 13, and the slider 13*a* as movable links is operated when the handle main body 2 is rotated in the above direction, and the second link 13 further rotates by a predetermined angle (θ) from the state of FIG. 3B.

On the other hand, the handle base 1 is provided with a latch operation mechanism (not shown) which operates by the rotation of the connecting shaft A113 of the second link 13 with the handle base 1 from FIG. 3B to FIG. 3C, and the latch operation mechanism releases a door latch device fixed to the door through an appropriate transmission means such as a cable device in accordance with the rotation of the handle main body 2 to an operation position.

The handle base 1 is provided with an adjustment portion 3. As shown in FIGS. 5A, 5B, 6A to 6D, the adjustment portion 3 includes a holding portion 7 and an adjuster 4 rotatably held by the holding portion 7. The holding portion 7 has a widthwise dimension substantially equal to a widthwise dimension of the hand hold portion 2*a* of the handle main body 2, and includes a columnar head portion 8 and a connecting portion 9 protruding from a peripheral wall of the columnar head portion 8. A stopper wall 9*a* projects from a protruding base end of the connecting portion 9 from the columnar head portion 8, and an elastic leg 9*b* projects from an end of the stopper wall 9*a*.

Figure 4A:
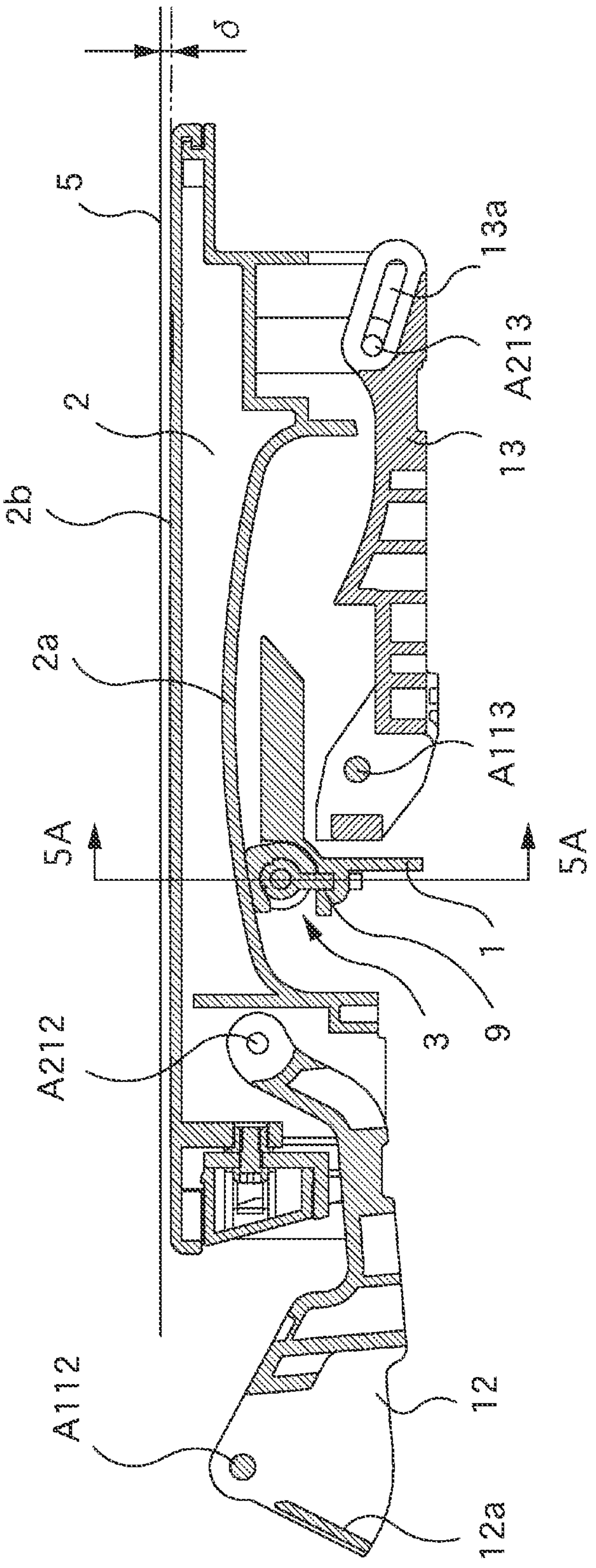
FIG. 4A is a view showing an adjustment state by an adjustment portion before adjustment.
Figure 4B:
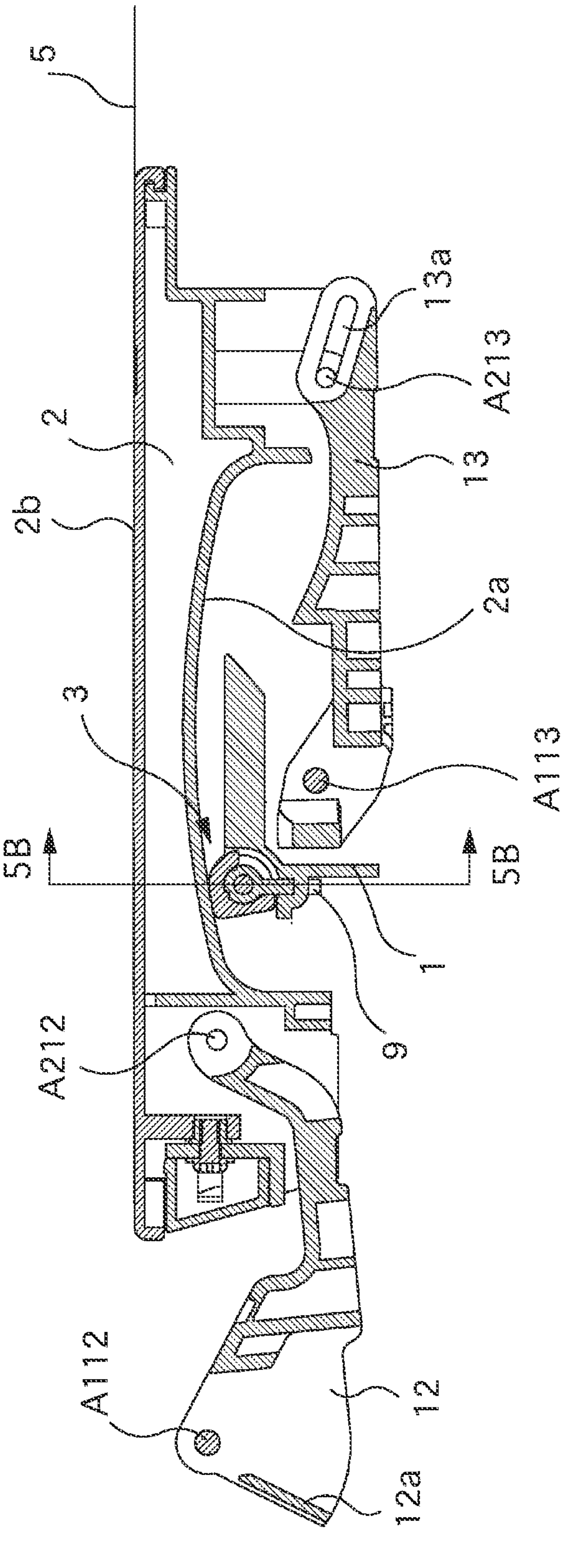
FIG. 4B is a view showing an adjustment state by the adjustment portion after adjustment.
Figure 5A:
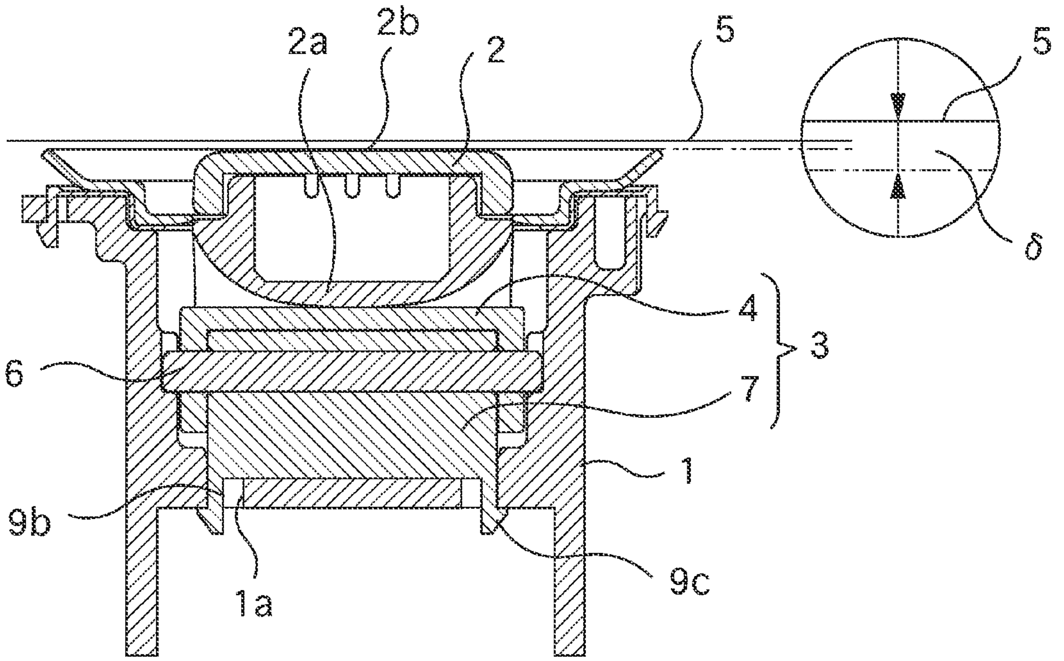
FIG. 5A is a sectional view taken along a line 5A-5A of FIG. 4A.
Figure 5B:
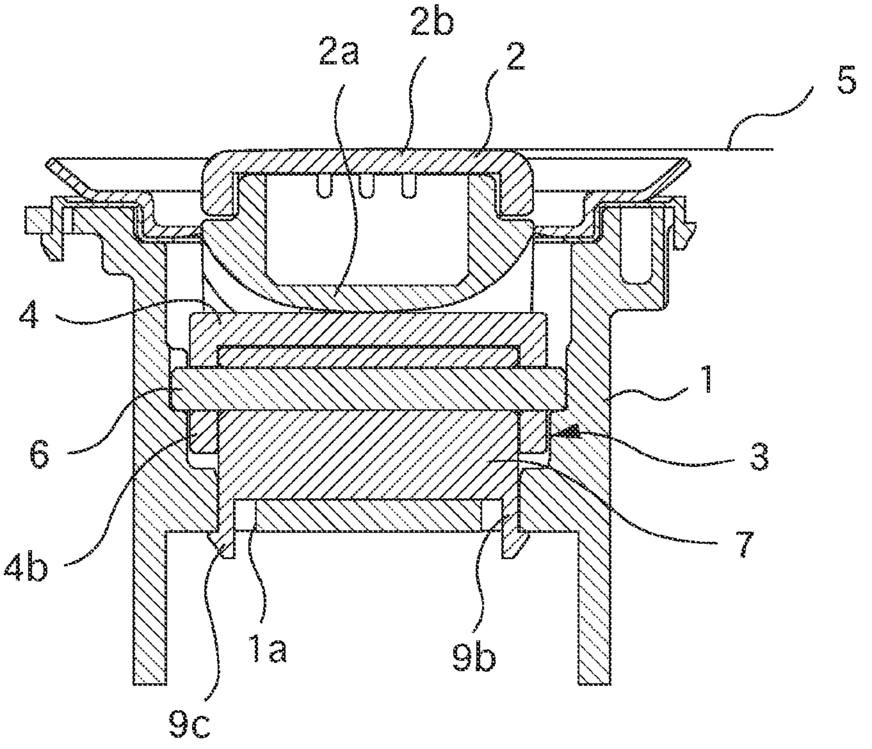
FIG. 5B is a sectional view taken along a line 5B-5B of FIG. 4B.

The elastic leg 9*b* projects from both end portions of the stopper wall 9*a* in the width direction, and the holding portion 7 is fixed to the handle base 1 by elastically locking a locking claw 9*c* formed at a tip end of the elastic leg 9*b* to a locking opening 1*a* formed in the handle base 1, as shown in FIGS. 5A and 5B. As shown in FIGS. 4A and 4B, the holding portion 7 is fixed in a posture in which the connecting portion 9 extends from the columnar head portion 8 toward a center in a vehicle width direction or extends along a thickness direction of the door, and the columnar head portion 8 is positioned at the outermost side in the vehicle width direction.

Figure 6A:
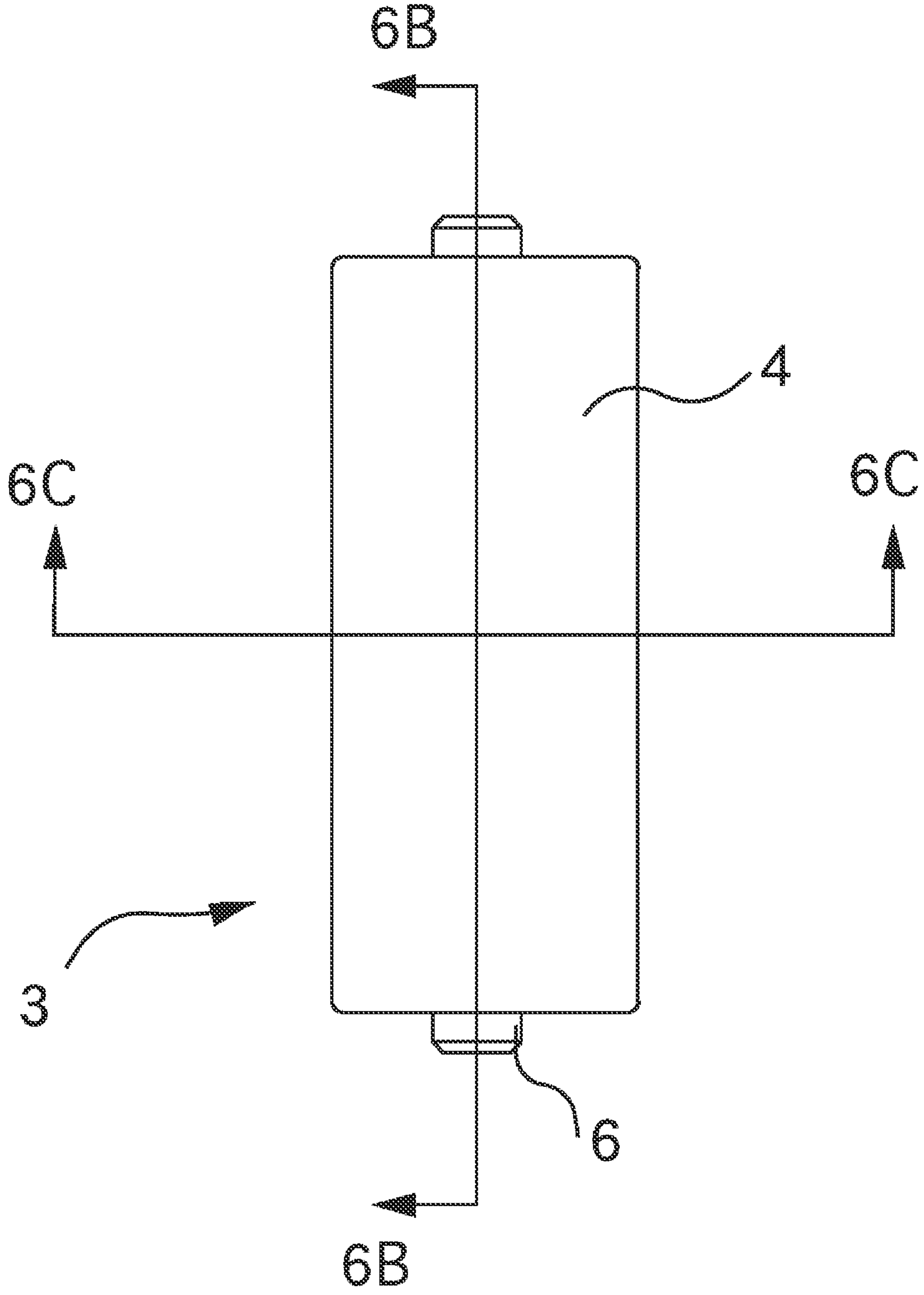
FIG. 6A is a front view of the adjustment portion.
Figure 6B:
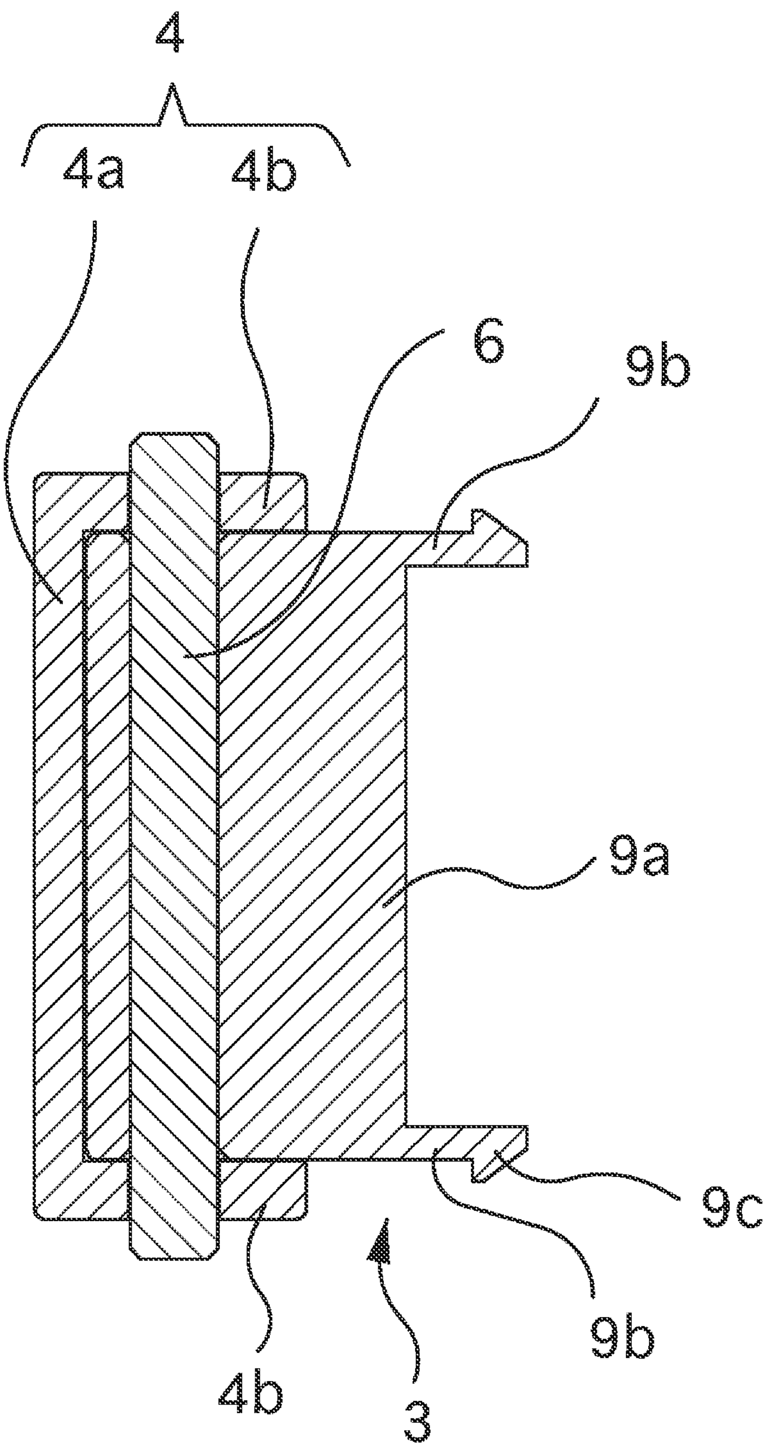
FIG. 6B is a sectional view taken along a line 6B-6B of FIG. 6A.

The adjuster 4 is formed of a material having good impact absorption capacity, such as rubber, a flexible synthetic resin material, or the like. As shown in FIG. 6B, the adjuster 4 is formed by projecting an attachment piece 4*b* extending from both side walls of a link receiving portion 4*a* along a side wall portion of the holding portion 7, and an attachment shaft 6 fixed on a center axis of the columnar head portion 8 is inserted into the attachment piece 4*b* and is connected to the holding portion 7.

Figure 6C:
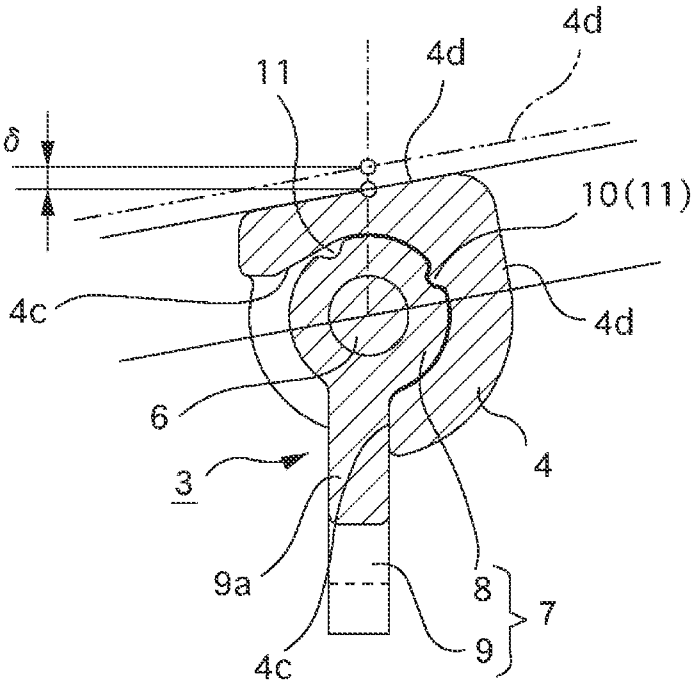
FIG. 6C is a sectional view taken along a line 6C-6C of FIG. 6A.
Figure 6D:
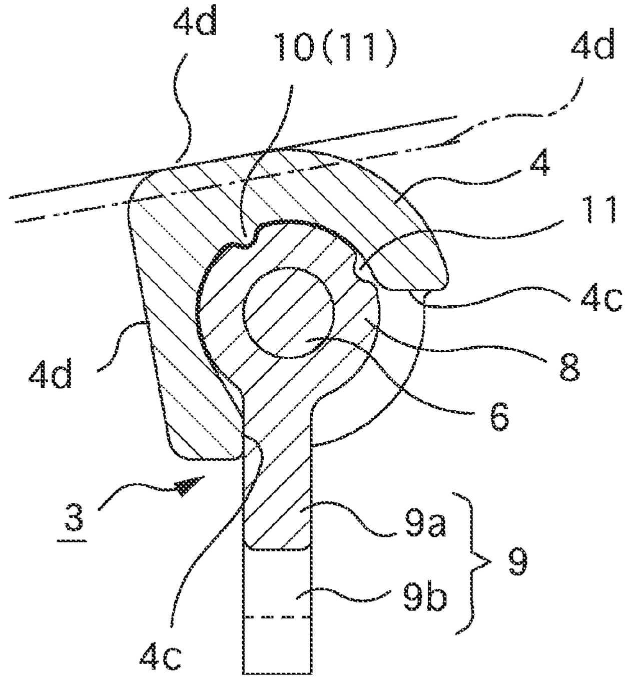
FIG. 6D is a sectional view taken along the line 6C-6C of FIG. 6A, showing a state after adjustment.

In a fixed state to the holding portion 7, a back surface (inner peripheral surface) of the link receiving portion 4*a* of the adjuster 4 is in contact with and supported by a surface of the columnar head portion 8 of the holding portion 7, the link receiving portion 4*a* covers the surface of the columnar head portion 8, and the back surface of the link receiving portion 4*a* can rotate about the attachment shaft 6 while sliding on the surface of the columnar head portion 8. As shown in FIGS. 6C and 6D, stoppers 4*c* that abut against the stopper wall 9*a* of the holding portion 7 to restrict a rotation angle are formed in the adjuster 4.

A convex portion 10 for click having a protruding shape on the back surface of the link receiving portion 4*a* of the adjuster 4 is formed over the entire length in the width direction of the adjuster 4, and concave portions 11 for click having a groove shape on the peripheral wall of the columnar head portion 8 of the holding portion 7 are formed over the entire length in the width direction of the holding portion 7. When the adjuster 4 is rotated about the attachment shaft 6, a click feeling is generated when the convex portion 10 for click is fitted into the concave portion 11 for click, and the rotation of the adjuster 4 is stopped. Thereafter, when the adjuster 4 is rotated about the attachment shaft 6, the convex portion 10 for click and the concave portion 11 for click exhibit an appropriate resistance force.

In this embodiment, a restraint stop position (rotation stop position) is set at two positions (an initial rotation position shown in FIG. 6C and an adjustment rotation position shown in FIG. 6D) at a rotation end position where the stopper 4*c* abuts against the stopper wall 9*a*, but the restraint stop position may be added to these intermediate positions.

An outer peripheral wall of the link receiving portion 4*a* has a cam shape in which a distance from the attachment shaft 6 is different depending on the rotation angle. In other words, the adjuster 4 is formed in a cam shape in which a distance between a rotation center (the attachment shaft 6) of the adjuster 4 and a surface of the outer peripheral wall of the adjuster 4 is different along a peripheral direction of the adjuster 4. In this embodiment, two abutment surfaces 4*d* are formed at two positions corresponding to two restraint stop positions. Each of the abutment surfaces 4*d* is formed by an inclined surface configured to abut against a ridge line on the back surface of the hand hold portion 2*a*.

The distance of the abutment surface 4*d* from the attachment shaft 6 is set such that, when the surface of the handle main body 2 is shifted from a predetermined position, for example, a position where the surface of the handle main body 2 is flush with the surface of the door panel 5 in a state in which the handle main body 2 is at the initial position, accurately when the surface of the handle main body 2 is at a position sinking from the surface of the door panel 5, the handle main body 2 can be pushed out to a predetermined position.

In this embodiment, the adjuster 4 also serves as a bumper at the initial position of the handle main body 2 at the time of initial setting, and the abutment surface 4*d* is formed so as to abut on the back surface of the hand hold portion 2*a* of the handle main body 2 at the time of the initial setting.

Therefore, in this embodiment, when the handle device is fixed to the door in an initial setting state and the surface of the handle main body 2 is in a state of sinking into the surface of the door panel 5 as shown in FIGS. 4A and 5A, the adjuster 4 of the adjustment portion 3 is rotated from the initial rotation position to the adjustment rotation position.

As described above, the abutment surface 4*d* of the adjuster 4 is formed by the inclined surface having the same inclination angle as the inclination angle of the ridge line on the back surface of the hand hold portion 2*a* of the handle main body 2 with respect to a predetermined horizontal plane, and when the rotation operation is performed from the initial rotation position shown in FIG. 6C to the adjustment rotation position shown in FIG. 6D, the abutment surface 4*d* moves from a position indicated by a solid line to a position indicated by a chain line in FIG. 6C.

The chain line in FIG. 6D indicates the position of the abutment surface at the initial rotation position.

As a result, the handle main body 2 is pushed out by a distance (6) in the vehicle width direction, and as shown in FIGS. 4B and 5B, when the handle main body 2 is positioned at the initial position, the surface of the handle main body 2 coincides with the surface of the door panel 5.

Figure 7:
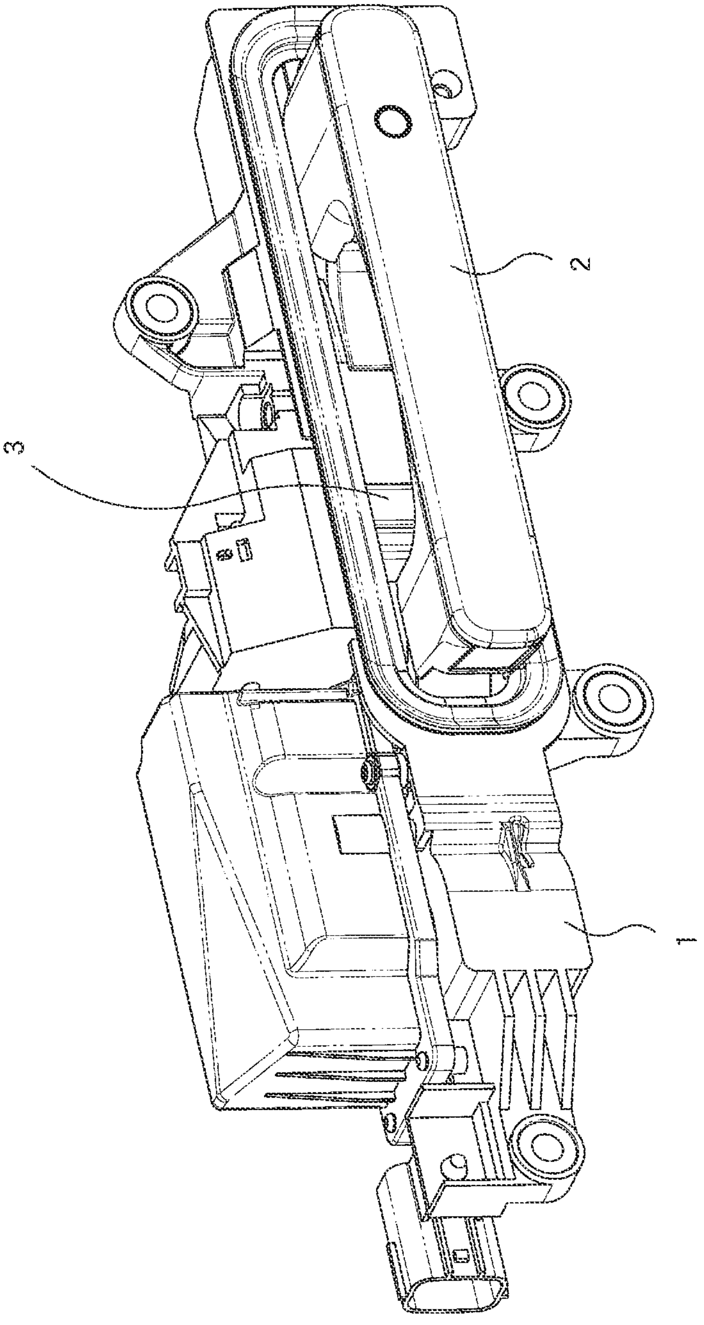
FIG. 7 is a perspective view showing a state in which the handle main body is pulled out to the pop-up position and the adjustment portion is exposed.

As shown in FIGS. 1 and 2, when the handle main body 2 is at the initial position, the adjuster 4 of the adjustment portion 3 is hidden by the handle main body 2 and is not exposed to the outside, but when the handle main body 2 is moved to the pop-up position, the adjuster 4 is exposed to the outside and is operable as shown in FIG. 7.

Therefore, even in a state in which the handle device is attached to the door, a positional relationship between the handle main body 2 and the door panel 5 at the initial position can be adjusted by temporarily moving the handle main body 2 to the pop-up position and operating the adjuster 4 from the initial rotation position to the adjustment rotation position.

In this case, if the position of the abutment surface 4*d* at the adjustment rotation position of the adjuster 4 is determined in consideration of the tendency of a deviation of the positional relationship with the door panel 5 at the initial position of the handle main body 2, a relative relationship between the handle main body and the door panel 5 of most of the handle devices can be kept within a range of an allowable value of the handle device for a vehicle of the embodiment of the present disclosure by a change operation of the two positions of the initial rotation position and the adjustment rotation position, but it is also possible to perform fine adjustment by further setting third and fourth rotational restraint positions and making positions of the respective abutment surfaces different.

According to the embodiment of the present disclosure, the handle device for a vehicle includes the handle base 1 fixed to a vehicle, and a handle main body 2 connected to the handle base 1 and configured to be able to be pulled out from the initial position. The handle base 1 is provided with the adjustment portion 3. The adjustment portion 3 is configured to be operable by being exposed to the outside when the handle main body 2 is pulled out from the initial position, and to adjust the position of the handle main body 2 at the initial position.

In the initial position of the handle device, the surface of the handle main body 2 needs to occupy a predetermined relative position with respect to the door surface 5 from a design demand or the like. In the embodiment of the present disclosure, the relative position of the handle main body 2 with respect to the door surface 5 at the initial position can be adjusted by operating the adjustment portion 3.

As a result, even when a deviation occurs in the relative position of the handle main body 2 with respect to the door panel (the door surface 5) at the initial position due to an error of an attachment position or the component, the handle main body 2 can be adjusted to a predetermined position.

Since the adjustment portion 3 is exposed to the outside in a state in which the handle main body 2 is moved from the initial position, an adjustment operation of the adjustment portion 3 is possible. Therefore, the position of the handle main body 2 can be adjusted while the handle device is fixed to the door. As a result, adjustment workability is improved.

The adjustment portion 3 is exposed to the outside in the state in which the handle main body 2 is moved from the initial position, and is not recognized from the outside at the initial position. Therefore, an uncomfortable feeling on the design does not occur.

The adjustment portion 3 may be configured by, for example, a screw that adjusts the position of the handle base 1 itself as long as the adjustment portion 3 can adjust the relative position of the handle main body 2 with respect to the door surface 5. When the handle device is configured as the link mechanism including the handle base 1 as the fixed link and the handle main body 2 as the movable link as components, the adjuster 4 can be included in the adjustment portion 3. In other words, both the handle main body 2 and the handle base 1 may together form the link mechanism having a fixed link and a plurality of movable links. The handle base 1 is the fixed link, and the handle main body 2 may be one of a plurality of movable links. The adjustment portion 3 may include the adjuster 4.

The adjuster 4 is disposed in a moving range of the handle main body 2 or another movable link, determines a movement stroke end on an initial position side of the handle main body 2 and the like by abutting against the handle main body 2 and the like, and as a result, adjusts the initial position of the handle main body 2. In other words, the adjuster 4 may be configured to abut against any one of the plurality of movable links and to determine the stroke end of any one of the movable links corresponding to a position where any one of the movable links is positioned when the handle main body 2 is at the initial position.

The adjuster 4 can be vertically rotatably operated around the attachment shaft 6 extending parallel to the door surface 5, and can be formed in a cam shape with an outer peripheral wall having a different distance from the rotation center by a rotation angle. In other words, the adjuster 4 may be formed in a cam shape in which the distance between the attachment shaft 6 and the surface of the outer peripheral wall of the adjuster 4 is different along the peripheral direction of the adjuster 4.

In this case, when the adjuster 4 is vertically rotated, the stroke end on the initial position side of the movable link in contact with the outer peripheral wall is changed, and as a result, the initial position of the handle main body 2 is changed.

The adjuster 4 can be stopped at an appropriate rotation position in a stepless manner by using an appropriate fastening means, but when the adjuster 4 is held by the columnar head portion 8 of the holding portion 7 connected to the handle base 1 so as to be able to be restrictively stopped at an appropriate rotation angle, the structure is simple and the adjustment operation is also simple. That is, the adjustment portion 3 may further include the holding portion 7 including the columnar head portion 8 and the connecting portion 9. The attachment shaft 6 may extend on the center axis of the columnar head portion 8 and protrude from the columnar head portion 8. The connecting portion 9 may project from the columnar head portion 8 and be connected to the handle base 1. The adjuster 4 may be connected to the attachment shaft 6, the inner peripheral surface of the adjuster 4 may be supported on the surface of the columnar head portion 8, and may be slidable on the surface of the columnar head portion 8. The convex portion 10 for click and the concave portion 11 for click may be respectively formed on the inner peripheral surface of the adjuster 4 and the surface of the columnar head portion 8, and the convex portion 10 for click and the concave portion 11 for click may be configured to be fitted to each other so that the adjuster 4 can be restrictively stopped at any rotation angle.

When the adjuster 4 is formed of a material having an impact absorption capacity, the adjuster 4 functions as a bumper for returning the handle main body 2 to the initial position, and it is possible to effectively prevent the occurrence of collision noise and impact. When the bumper is set in a portion other than the adjuster 4, the function of the bumper may not be exerted by the position adjustment of the handle main body 2, but when the adjuster 4 is used as a bumper, a function as a bumper can be normally exhibited regardless of a degree of adjustment of the position of the handle main body 2, and thus generation of collision noise or the like can be reliably prevented.

According to the embodiment of the present disclosure, there is an error or the like between the components, and even if the handle main body and the door surface are deviated from a predetermined positional relationship, the position adjustment can be performed without reattaching the handle main body and the door surface again.

What is claimed is:

1. A handle device for a vehicle comprising:
a handle base to be fixed to a vehicle; and
a handle main body connected to the handle base and configured to be able to be pulled out from an initial position,
wherein the handle base is provided with an adjustment portion,
wherein the adjustment portion is configured to be operable when exposed to an outside of the vehicle when the handle main body is pulled out from the initial position to adjust a position of the handle main body at the initial position,
wherein the handle main body and the handle base together form a link mechanism having a fixed link and a plurality of movable links,
wherein the adjustment portion includes an adjuster configured to abut against any one of the plurality of movable links, and to determine a stroke end of any one of the plurality of movable links,
wherein the adjuster is mounted for rotation around an attachment shaft, and wherein the adjuster has a cam shape in which a distance between the attachment shaft and a surface of an outer peripheral wall of the adjuster differs along a peripheral direction of the adjuster.

2. The handle device for a vehicle according to claim 1,
wherein the handle base is the fixed link,
wherein the handle main body is one of the plurality of movable links,
wherein the stroke end of the any one of the plurality of movable links corresponds to a position where the any one of the plurality of movable links is positioned when the handle main body is at the initial position.

3. The handle device for a vehicle according to claim 2,
wherein the adjuster is formed of a material having an impact absorption capacity.

4. A handle device for a vehicle according to claim 2, comprising:
a handle base to be fixed to a vehicle; and
a handle main body connected to the handle base and configured to be able to be pulled out from an initial position,
wherein the handle base is provided with an adjustment portion,
wherein the adjustment portion is configured to be operable when exposed to an outside of the vehicle when the handle main body is pulled out from the initial position, to adjust a position of the handle main body at the initial position,
wherein the handle main body and the handle base together form a link mechanism having a fixed link and a plurality of movable links,
wherein the handle base is the fixed link,
wherein the handle main body is one of the plurality of movable links,
wherein the adjustment portion includes an adjuster,
wherein the adjuster is configured to abut against any one of the plurality of movable links, and to determine a stroke end of any one of the plurality of movable links corresponding to a position where any one of the plurality of movable links is positioned when the handle main body is at the initial position,
wherein the adjuster is capable of vertical rotation operation around an attachment shaft extending parallel to a door surface, and
wherein the adjuster is formed in a cam shape in which a distance between the attachment shaft and a surface of an outer peripheral wall of the adjuster differs along a peripheral direction of the adjuster.

5. The handle device for a vehicle according to claim 4,
wherein the adjustment portion further includes a holding portion including a columnar head portion and a connecting portion,
wherein the attachment shaft extends on a center axis of the columnar head portion and protrudes from the columnar head portion,
wherein the connecting portion projects from the columnar head portion and is connected to the handle base,
wherein the adjuster is coupled to the attachment shaft,
wherein an inner peripheral surface of the adjuster is supported on a surface of the columnar head portion,
wherein the inner peripheral surface of the adjuster is slidable on the surface of the columnar head portion,
wherein a concave portion for click is formed on one of the surface of the columnar head portion and the inner peripheral surface of the adjuster and a convex portion for click is formed on the other of the surface of the columnar head portion and the inner peripheral surface of the adjuster, and
wherein the concave portion for click and the convex portion for click are configured to be fitted to each other so that the adjuster is capable of being restrictively stopped at any rotation angle.

* * * * *